United States Patent [19]

Dallmann et al.

[11] Patent Number: 4,572,854
[45] Date of Patent: Feb. 25, 1986

[54] MULTILAYER FILM WITH A GAS AND AROMA BARRIER LAYER AND A PROCESS FOR THE PREPARATION AND APPLICATION THEREOF

[75] Inventors: Hermann Dallmann, Wiesbaden; Hans J. Palmer, Walluf, both of Fed. Rep. of Germany

[73] Assignee: Hoechst Aktiengesellschaft, Frankfurt am Main, Fed. Rep. of Germany

[21] Appl. No.: 582,552

[22] Filed: Feb. 25, 1986

[30] Foreign Application Priority Data

Feb. 23, 1983 [DE] Fed. Rep. of Germany ....... 3306189

[51] Int. Cl.[4] .............................................. B32B 27/00
[52] U.S. Cl. ...................... 428/35; 428/349; 428/516; 428/518; 428/520; 156/244.11
[58] Field of Search ............... 428/516, 349, 35, 518, 428/520, 522; 156/244.11

[56] References Cited

U.S. PATENT DOCUMENTS

| | | | |
|---|---|---|---|
| 4,212,956 | 7/1980 | Katsura | 525/60 |
| 4,254,169 | 3/1981 | Schroeder | 428/35 |
| 4,367,305 | 1/1983 | Satoh et al. | 524/398 |
| 4,400,428 | 8/1983 | Rosenthal | 428/349 |

FOREIGN PATENT DOCUMENTS

| | | |
|---|---|---|
| 0062815 | 3/1982 | European Pat. Off. . |
| 2931035 | 2/1981 | Fed. Rep. of Germany . |
| 3120308 | 8/1984 | Fed. Rep. of Germany . |
| 1567189 | 10/1976 | United Kingdom . |
| 2025839 | 8/1978 | United Kingdom . |

Primary Examiner—Edith Buffalow
Attorney, Agent, or Firm—Schwartz, Jeffery, Schwaab, Mack, Blumenthal & Evans

[57] ABSTRACT

The invention concerns a multilayer, preferably sealable film, comprising one or more inner layers; more specifically, (1) an inner barrier layer D containing a saponified ethylene-vinyl acetate polymer having 15 to 60 mole % ethylene units and being saponified to at least 90 mole %; and (2) at least one layer immediately adjacent to the surface of the barrier layer D, which layer is an adhesion-promoting layer C and comprises a modified polymer or the modified polyolefin. All layers of the film are oriented at least biaxially under identical conditions. On one side of the barrier layer D, adjacent to the first adhesion-promoting layer C, a first layer B is located, and an optionally, a sealable layer A, is adjacent thereto. Layer B contains a polypropylene homopolymer and/or a propylene copolymer and/or the material of the layer C and/or the material of the optional layer A. Also disclosed is a process for the preparation of a multilayer film as described, and its use, in particular, in the packaging of oxygen-sensitive goods.

30 Claims, 6 Drawing Figures

A
B
C
D
C

A
B'(B+C)
D
C

B"(A+B)
C
D
C

B'"(A+C+IB)
D
C

B""(C+B)
D
C

A
B
C
D
C
B
A

MULTILAYER FILM WITH A GAS AND AROMA BARRIER LAYER AND A PROCESS FOR THE PREPARATION AND APPLICATION THEREOF

BACKGROUND OF THE INVENTION

The present invention relates to a multilayer, preferably sealable laminated film having a barrier layer therein, as well as to a process for its manufacture and use.

A multilayer film having a barrier layer made of a material such as that used in the present invention is described in German Offenlegungsschrift No. 26 44 209 (equivalent to British Patent Specification No. 1,567,189). The disclosed film has a multilayer structure including a base comprised of polypropylene, an intermediate layer comprising a modified polyolefin provided on the base film, and a barrier layer to reduce oxygen permeability, with a heat seal layer optionally applied to the barrier layer. The film is prepared, according to the aforementioned German Offenlegungsschrift, by applying to the transversely or longitudinally axially oriented polypropylene base film a two-layer melt comprising the polymers of the intermediate layer and the barrier layer. The composite film thus obtained is then oriented by stretching it in the transverse direction. The heat sealable layer is applied subsequently, i.e., after the preparation of the three-layer composite film, in a further step and is therefore essentially unoriented. As a result, different orientation values are obtained for the layers of the base film, the intermediate/barrier layer, and the heat seal layer, respectively.

It has now been found that the above-discussed film is frequently incapable of satisfying requirements concerning gas barrier properties, water resistance, and other physical properties, which requirements have become increasingly stringent.

To improve the sliding properties of the film disclosed by German Offenlegungsschrift No. 26 44 209, European Patent Application No. 0 062 815 describes a process to modify the outer sealing layer by means of special additives. The disclosed modification of the outer sealing layer does not improve the gas barrier properties and water resistance of the film. Furthermore, the individual layers are not oriented under the same conditions.

On the other hand, the existing sealable, multilayer films having a barrier layer comprised of ethylene-vinyl alcohol copolymers cannot be produced by extruding all of the layers simultaneously to obtain an orientation of all layers by stretching under identical conditions.

SUMMARY OF THE INVENTION

It is therefore an object of the present invention to improve the physical properties of multilayer film laminates, particularly their barrier properties against atmospheric oxygen and aromas, such as flavors, ordors, etc.

It is a further object of the present invention to extend the sealing range of multilayer laminates to which are applied outer sealing layers.

It is another object of the present invention to provide improved multilayer laminates comprising one or more barrier layers containing ethylene-vinyl alcohol copolymers.

It is yet another object of the present invention to provide an improved process for producing multilayer film laminates, including those with barrier layers comprised of an ethylene-vinyl alcohol copolymer.

In accomplishing the foregoing objects, there is provided in accordance with the present invention a multilayer film which comprises (a) an inner barrier layer D comprised of a saponified ethylene-vinyl alcohol copolymer which contains about 15 to about 60 mole % ethylene units and which is saponified to at least approximately 90%, said inner barrier layer presenting a first surface and a second surface; (b) on at least one of said first and second surfaces, an adhesion-promoting layer C comprised of a modified polyolefin; and (c) adjacent to said adhesion-promoting layer, a layer B comprised of at least one polymer selected from the group consisting of a propylene homopolymer, a propylene copolymer, and said modified polyolefin, wherein all of the layers of the multilayer film are biaxially oriented under substantially the same stretching conditions.

In addition, there is provided a process for manufacturing a multilayer film which comprises the steps of (a) providing at least three separate melts comprising, respectively, (i) a saponified ethylene-vinyl alcohol copolymer which contains about 15 to about 60 mole % ethylene units and which is saponified to at least approximately 90%, (ii) a modified polyolefin, and (iii) one selected from the group consisting of a polypropylene homopolymer, a polypropylene copolymer and said modified polyolefin; (b) coextruding said melts to produce a multilayer composite; and thereafter (c) stretching said multilayer composite both transversely and longitudinally.

BRIEF DESCRIPTION OF THE DRAWINGS

In the drawings, FIGS. 1-6 each show, respectively, a cross-sectional view of a different multilayer film within the present invention.

DETAILED DESCRIPTION OF PREFERRED EMBODIMENTS

The multilayer film of the invention has a gas and aroma barrier layer D of the aforementioned copolymer and additional layers on either side of said layer, wherein at least one of the two surface layers of the multilayer film preferably comprises a sealable outer layer A. Directly on at least one of the two surfaces of the barrier layer D, respectively, a layer C is provided, said layer C representing an adhesion-promoting layer consisting essentially or exclusively of adhesion-promoting polymers, or alternatively, comprising a mixture of polymers containing an adhesion-promoting polymer (B', B'', B''', B'''').

Figure 1:
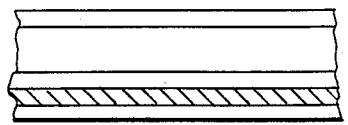

For the purposes of the following description, one surface of barrier layer D facing optional sealable outer layer A will be arbitrarily designated the "first surface of barrier layer D." Between optional sealable outer layer A and the first surface of the barrier layer D, a first layer B is provided which is thicker than layers A and D and which performs the function of a base or support. Between the first layer B and the barrier layer D, the first adhesion-promoting layer C is present. The thickness of the layer B, which preferably amounts to about 10 to 20 microns, is essentially responsible for the mechanical properties and dimensional stability of the multilayer film, while the thickness of the optional layer(s) A and of layers C and D is relatively small, primarily because of cost considerations, and is appropriately between about 1 micron and 3 microns (FIG. 1).

Figure 2:
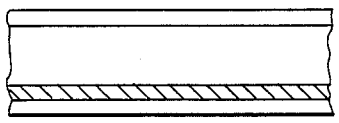

In one embodiment, layers B and C comprise a common, homogeneous layer combining both of their thicknesses, which layer (B′) contains both the polymers of layer B and the polymers of the layer C (FIG. 2).

Figure 3:
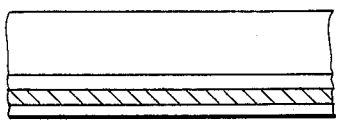

In another embodiment, layer A and the first layer B are comprised of the same polymer mixture and form a single layer which combines both of their thicknesses. Layer B in this case (B″) also has heat sealing properties. The aforementioned polymer mixture includes the heat sealing polymer material of layer A and the polymers of layer B (FIG. 3).

Figure 4:
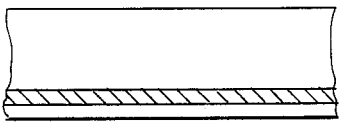

In yet another embodiment, only a single layer B‴ is present on the first surface of the barrier layer D, which layer is both heat-sealable and is attached with sufficient strength to barrier layer D. For this embodiment, a mixture of polymers is used which includes the adhesion-promoting material of the layer C and the heat-sealing material of the layer A, and optionally, the polymers of layer B. The thickness of the single layer corresponds to the total thickness of the alternative three-layer structure of the layers A, B and C (FIG. 4).

Figure 5:
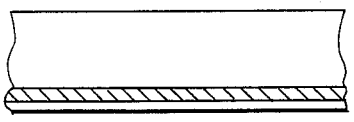

In still another embodiment, only a single layer B⁗, which includes C and B, is found on barrier layer D. Heat-sealing is not used in this embodiment (FIG. 5).

Figure 6:
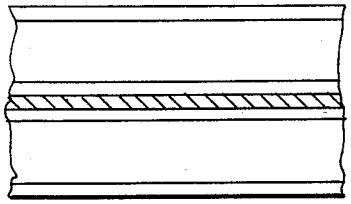

The layers present on the opposite side of the barrier layer D, hereinafter designated the "second surface of D," include, for example, a layer each of A, B, and C, and are provided in configurations similar to those described for the aforementioned embodiments of the first surface of the barrier layer D (FIG. 6). Thus, combinations provided in the second surface of D of the layers A, B, and C; A and B′ (B contains adhesion-promoting material); and B″ (B contains preferably heat sealing material) and C are all within the scope of the present invention.

It is preferable, however, for certain applications to eliminate the second sealable layer A and, possibly, the second layer B from the second surface of D. In such a case, a sealable surface may be produced on the second surface only at a later time, i.e., after extrusion. This may be accomplished, for example, by partial- or full-surface application effected by the printing-on of a sealable layer comprised of specially formulated polyolefins. At temperatures below 100° C., this layer is preferably sealable against itself and against other sealable layers comprised of polyolefins. This printed-on sealable layer may be located on the existing layer C or B, or it may be applied subsequently to a sealable outer layer A, if, for example, it should be discovered that the layer A is not particularly advantageous for a given special use. An ethylene-vinyl acetate copolymer is suitable as the preferred principal component for the printed-on sealable layer, since it permits the maintenance of relatively low sealing temperatures i.e., under 100° C. Alternatively, compounds that are adhesive at even lower temperatures, such as natural rubber, may be used as additional components or as other principal components. The additional components impart a sealing capability to the printed-on layer against layers of the same material with the application of pressure only. Such adhesives are known, for example, as pressure-sensitive adhesives or contact adhesives.

The barrier layer D serves as a gas barrier, in particular an oxygen or aroma barrier, and is comprised of an ethylene-vinyl alcohol copolymer with an ethylene content of about 15 to 60 mole % and a saponification degree of at least about 90 mole %, preferably higher than about 96 mole % and in particular approximately 99 mole %. These copolymers include, for example, ethylene-propylene-vinyl alcohol copolymers and reaction products of ethylene-vinyl alcohol copolymers with lower aldehydes or ketones, as described, for example, in German Offenlegungsschrift No. 29 31 035 and U.S. Pat. No. 4,212,936.

The ethylene-vinyl alcohol copolymers may contain water during extrusion, preferably in amounts of about 1 to 10% by weight. But to obtain a high orientation effect and, thus, a good gas barrier, it is preferable to have a water content less than 5%, preferably less than 3.5%, and in particular, less than 2% by weight or approaching zero. These values should be obtained especially during the manufacturing of the film, immediately prior to the stretching process.

The barrier layer D comprised of ethylene-vinyl alcohol copolymers may contain monomer, oligomer, or polymer substances to improve its stretchability (i.e., to influence crystallinity). The amount added in each case is controlled by the substances' compatibility (i.e., by the capacity for being worked in and mixed) with the principal component, and by the effect on the oxygen barrier. Examples of such substances are compounds containing hydroxyl and/or carbonyl groups, such as trimethylolpropane, neopentyl glycol, and polyethylene glycol, and in particular substances which have barrier properties of their own, such as polyvinyl alcohols or polyamides. Mixtures of ethylene-vinyl alcohol copolymers and about 0.5 to 50% by weight of polyvinyl alcohol with a hydrolysis degree higher than about 80, in particular higher than or equal to about 88 mole %, and a viscosity of from about $0.4 \times 10^{-2}$ to about $4 \times 10^{-2}$ Pa.s, in particular from about $0.4 \times 10^{-2}$ to $1 \times 10^{-2}$ Pa.s, are preferred.

Polyamides are compatible with ethylene-vinyl alcohol copolymers over the entire miscibility range and therefore are readily worked in. Such mixtures (blends) have already been described in European Patent Application No. 00 63 006. The films produced from them, however, are not oriented. Of the different polyamides available, the 6,12- and 6,6-copolyamides with a softening point of less than about 210° C. are especially suitable. Preferably, about 10 to 60% by weight and even more preferably about 10 to 20% by weight of a polymer or copolymer are added.

The mixing ratio is chosen so that the film is readily stretchable biaxially at the selected stretch parameters, with the gas barrier being unaffected, or being only slightly affected.

Initial extruded granules may be prepared from the granulated mixture of the polymers by known means. Preferably, the mixtures of granules are processed directly, for example, with an extrusion screw having an especially good homogenizing effect, i.e., a screw with a shear portion.

The barrier layer D comprised of ethylene-vinyl alcohol copolymers may contain further additional additives in the form of monomers, oligomers or polymers which promote adhesion to adjacent layers. Examples of such additional substances are graft-modified polyolefins, ethylene-acrylic acid copolymers, ionomers, and olefin copolymers.

In place of one barrier layer, the film may contain several oriented barrier layers which are preferably connected by an adhesion-promoting layer.

The adhesion-promoting layers C may advantageously contain a graft-modified olefin homopolymer or copolymer, a partially saponified ethylene-vinyl alcohol copolymer with a low degree of saponification, or mixtures thereof with other polyolefins. Particularly preferred are polypropylene homopolymers or copolymers graft-modified with carboxylic acids or their anhydrides.

The polymer of layer B may be comprised of a propylene homopolymer or copolymer with a melting point of about 140° C. or higher, preferably about 150° C. or higher. Examples of suitable polymers for layer B are isotactic polypropylenes with a heptane soluble proportion of 15% by weight or less, ethylene copolymers with propylene and an ethylene content of up to 15% by weight, and copolymers of propylene with butene, pentene, hexene, heptene, octene, and/or other olefins. Mixtures of the above-mentioned copolymers may also be used. The melt flow index (MFI) of the polypropylene polymers advantageously used in this context is within a range of about 0.5 g/10 min. to about 8 g/10 min. at 230° C. and 2.16 kp/cm$^2$ (DIN 53735). The polypropylene polymers may contain additives, such as stabilizers, pigments, and low molecular weight, compatible resins or polymers.

Of the additive pigments, those lending the film a pearly lustre are preferred. Examples of such pigments are titanium dioxide, calcium carbonate, and silicon dioxide. The pigment particle size is preferably within a range of about 0.1 micron to about 20 microns, the amount added preferably in the range of about 1 to about 25% by weight. Examples of low molecular, compatible resins are petroleum resins, terpene resins, and natural oil resins obtained in the cracking of naphtha or gas oil. The resins may be hydrated and/or modified by the introduction of special monomers prior to polymerization.

The working-in of the resins to prepare mixtures to comprise layer B is effected by convenional methods. The amount of resin added is controlled by its effect on optical properties and stretchability. More than 20% by weight with respect to the propylene polymers is not necessary for processing reasons, for example, with low molecular resins, such as terpene resins.

The film is preferably sealable, while the sealable layers on either side of barrier layer D may have different thicknesses and compositions.

The optionally but preferably present sealing-layer polymer of layer A is advantageously comprised of at least one polymer selected from the group consisting of a homopolymer or a copolymer of an olefin, preferably an alpha-olefin, an ionomer, a mixture of these or of different polyolefins, and an ethylene-propylene-$C_n$ terpolymer, where $C_n$ denotes an alkylene monomer having n carbons, n being an integer ranging between 4 and 10. Preferably, the sealable outer layer A is comprised of a low or high density ethylene homopolymer or an ethylene copolymer. Especially preferred are ethylene-propylene copolymers and ethylene-propylene-butylene terpolymers, wherein the ethylene content is preferably from about 0.1 to about 15% by weight and the butylene content is within about 1 to about 20% by weight.

To improve its sealing capability, scratch resistance and running safety in high speed packaging machines, the sealing layer polymer of layer A may contain conventional additives, such as low molecular resins and lubricants, slip and antiblocking-agents. To optimize the very different requirements concerning sealing properties, combinations of copolymers and/or terpolymers with polymers, low molecular resins and polydiorganosiloxanes are preferably used. The density of the sealing layer polymers is preferably within a range of about 0.89 to about 0.96 g/cm$^3$, the melt index within about 0.1 to about 16 g/10 min. and 2.16 kg/cm$^2$ (DIN 53735), and the softening point within about 60° to about 180° C. (DIN 1995-44), and particularly preferably between approximately 80° and 140° C.

The layer thickness of a sealable outer layer A is preferably within about 0.1 micron to about 10 microns, particularly preferably within about 1 micron to about 3 microns.

As described above, sealable layers may subsequently be applied on one or both sides to the other layers, i.e., after coextrusion. Preferably, the sealable layers have a sealing-onset temperature lower than that of layer A, or, alternatively, seal under the effect of pressure alone. These sealing layers, which after the preparation of the film may preferably be applied in a single working step during the printing of the film, may have layer thicknesses of about 0.1 micron to about 10 microns, preferably about 0.1 micron to about 5 microns.

These heat sealable layers, deposited from solutions or dispersions, may contain as principal components acrylates, ethylene-vinyl acetate copolymers, or ionomers, and the cold-sealing layers may contain natural rubber latex. They may also contain, similarly to layer A, additives such as lubricants and slip- and antiblocking-agents. To improve adhesion to the film and abrasion-resistance, the layers may be anchored on the film by means of an adhesion-promoter, for example, one containing polyurethane. A corona treatment of the film is in many cases sufficient to improve the adhesion of this additional layer or layers.

The films provided with cold-sealable layers are preferably coated on the reverse side with a dehesive lacquer, i.e., with an anti-adhesive agent. Examples of suitable dehesive lacquers are those comprised of polyamides or vinyl-containing siloxanes, which may also be cross-linked.

The multilayer film according to the present invention, when stretched at least biaxially, preferably has a total thickness of about 10 to about 100 microns, preferably about 15 to about 35 microns, wherein the major part of the thickness is made up by B layer(s).

The film according to the present invention produced by coextruding layers B, C, D, C (B optional), or A, B, C, D, C, (B and A optional) and then stretching, at least biaxially, has an excellent gas- and aroma-barrier capacity in comparison with a nonoriented film stretched at high temperatures or high atmospheric humidities, together with good mechanical properties. It is therefore outstandingly suitable for the packaging of oxygen-sensitive food, luxury, e.g., tobacco, and pharmaceutical items.

By the addition of pigments such as calcium carbonate to the polymers of the layers B or C, an opaque film is obtained.

Providing the multilayer film of the present invention with low temperature sealing or cold-sealing layers opens up new fields of application, for example, in the packaging of temperature-sensitive luxury items.

The control of gas permeability by means of layer thickness, formulation, and degree of stretching, together with the provisions of a wide sealing range, permit other industrial applications. Examples are the wrapping of synthetic plastic piping for heating purposes and the like, in order to reduce the oxygen permeability.

To produce the films of the present invention by means of coextrusion, successively flanged distributor systems may be coupled with a T-slot die. The layout of the distributor systems, together with the number of channels of the die, depends on the composite structure desired.

The production of a seven-layer film is appropriately carried out with the use of a three-layer die. In the case of a symmetric film structure, the melts of the polymers for layers B, C, and D may be extruded through the center channel and the melts for the outer sealing layers A simultaneously through the outer channels onto a chill roll.

The surface temperature of the chill roll is preferably below room temperature. The side of the melt facing away from the chill roll may be cooled additionally by means of air blowers.

The biaxial stretching of the film may be performed simultaneously or in steps. In the preferred biaxial, stepwise stretching process, stretching is initially carried out longitudinally by means of heated rolls and transversely thereafter with a stenter and then the film is heat-set. Stretching temperatures are within the usual range for polypropylene film. The longitudinal stretching temperature is appropriately within a range of about 80° to about 150° C., preferably within about 110° to about 130° C.; the transverse stretching temperature (air temperature of the transverse stenter is advantageously from about 100° to about 170° C., preferably from about 110° to about 130° C.

The longitudinal and transverse stretch ratios are usually between 2 and 5, preferably between 3 and 5 for the longitudinal stretch ratio and from about 3 to 12, preferably 6 to 10, for the transverse stretch ratio.

To optimize mechanical properties and the oxygen barrier properties, longitudinal stretching of the film may be carried out in two steps, or the longitudinal transverse stretching may be followed, prior to thermofixing, by an additional longitudinal stretching.

Stretching is followed by a heat treatment in the thermo-fixed or stress-relieved state in a temperature range of about 100° to about 180° C., preferably about 140° to about 175° C. Thus, the post-stretching heat treatment generally is at a temperature between about 100° C. and a temperature less than the melting point of the material comprising barrier layer D or, if it is present, layer B. This heat treatment, also characterized as thermo-fixing, may be eliminated when the shrinkability of the film during heating is to be maintained.

The examples described below are illustrative only, and do not restrict the scope of the present invention.

All measurements of oxygen permeability were performed with an OXTRAN 100 instrument of Matern Controls, Inc.

EXAMPLE 1

A film sealable on both sides, comprising (1) an ethylene-propylene copolymer for layer A having an ethylene content of 4.1%, a MFI of 22.4 g/10 min. at 230° C./5 kp/cm², and a melting point of 143° C.; (2) for layer B a mixture of a polypropylene with a MFI of 9 g/10 min. at 230° C./5 kp/cm² and a melting point of 162° C. and 20% by weight of a terpene resin with a melting point of 125° C.; (3) for layer C a polypropylene modified with a carboxylic acid anhydride, having a MFI of 10 g/10 min, a density of 0.89 g/cm³ and a melting point of 153° C.; and (4) for layer D a mixture of an ethylene-vinyl alcohol copolymer with an ethylene content of 42 molar % and a saponification degree of 99.5 mole % and 30% by weight of a polyvinyl alcohol with a hydrolysis degree of 88 mole %, was prepared by coextrusion. The melt was extruded from a slot die with a width of 280 mm, a slot width of 1.8 mm, and a die temperature of 230° C. onto a chill roll with a surface temperature of 10° C., and was laid onto the chill roll by means of a suction box and pinning (electric wire discharge). The runout velocity of the chill roll was 4.6 m/min. The film was next stretched with rolls longitudinally by a factor of 3.8 with a roll temperature of 130° C. and at an air temperature of 122° C. in a stenter transversely by a factor of 7.

The resulting biaxially-stretched, 40 micron-thick film had a gas barrier layer of 1.2 microns, and an oxygen permeability of 5.8 cm³·d·bar at 20° C. and 0% relative humidity (r.F.).

EXAMPLE 2

The experiment described in Example 1 was repeated with the difference that the barrier layer was comprised of a mixture of (a) an ethylene-vinyl alcohol copolymer with an ethylene content of 29 molar %, a saponification degree of 99.9 molar %, and a melting point of 188° C.; and (b) 20% by weight of a copolyamide with a melting point of 196° C. and a density of 1.14 g/cm³.

The film thus obtained was stretched longitudinally by rolling at a temperature of 135° C. by a factor of 4.4 and by means of a stenter at 120° C. by a factor of 6 and heat treated at an air temperature of 160° C. in the set condition.

The resulting, oriented, clear film had a thickness of 28 microns, a barrier layer of 0.8 micron, and an oxygen permeability of 12.5 cm³/m²·d·bar at 93% r.F.

EXAMPLE 3

The experiment described in Example 1 was repeated with the difference that the barrier layer was comprised of a mixture of (a) an ethylene-vinyl alcohol copolymer with an ethylene content of 32 mole % and a saponification degree of 99.6 mole %; and (b) 5% by weight of neopentyl glycol.

The film obtained in this manner was stretched by means of a roll stretch installation at 135° C. by a factor of 3.2 in the longitudinal direction and subsequently at 128° C. in a stenter by a factor of 5.4 in the transverse direction.

The resulting 17 micron-thick film had a barrier layer of 1.1 micron and an oxygen permeability of 6.9 cm³/m²·d·bar at 93% r.F.

EXAMPLE 4

A multilayer film, comprising (1) a mixture for layer B of polypropylene with a MFI of 9 g/10 min. at 230° C., 5 kp/cm² and 20% by weight of a terpene resin with a melting point of 125° C.; (2) for layer C a polypropylene modified with carboxylic acid anhydride with a density of 0.9 g/cm³, a MFI value of 4.7 g/10 min. (D 1238-65 T), and a melting point of 165° C.; and (3) an ethylene-vinyl copolymer for layer D with an ethylene content of 42 mole % and a saponification degree of 99.9 mole %, was produced by coextrusion with a slot die having a width of 480 mm and a slot width of 1 mm onto a chill roll with a diameter of 600 mm and a surface temperature of 10° C., running at a circumferential velocity of 4.5 m/min. The film was conducted from the chill roll to a three-roll stand running at 4.5 m/min. and from there to a heated roll stretch installation.

The film thus obtained was subsequently stretched longitudinally by a factor of 3 at a temperature of 120° C. by means of rolls and in the transverse direction with a stenter by a factor of 6, at 110° C.

The resulting clear, biaxially-oriented film had a thickness of 33 microns, a gas barrier of 1.1 micron, and an oxygen permeability of 16 $cm^3/m^2 \cdot d \cdot bar$ at 93% r.F.

EXAMPLE 5

The experiment described in Example 4 was repeated with a mixture for the barrier layer of (1) an ethylene-vinyl alcohol copolymer with an ethylene content of 32 mole %, a saponification degree of 99.6 mole %, and a melting pint of 182° C., and (2) 20% by weight of a copolyamide with a melting point of 204° C.

The film was stretched by a factor of 3.1 at 131° C. by rollers in the longitudinal direction and at an air temperature of 130° C. in a stenter transversely by a factor of 9.5 and heat treated in the set condition at 150° C.

The resulting biaxially-stretched, clear film had a thickness of 18 microns, a barrier layer of 1.2 micron, and an oxygen permeability of 11 $cm^3/m^2 \cdot d \cdot bar$ at 93% r.F.

EXAMPLE 6

The experiment described in Example 4 was repeated with the difference that for the barrier layer D a mixture was used of an (a) ethylene-vinyl alcohol copolymer with an ethylene content of 42 mole %, a saponification degree of 99.9 mole %, and a melting point of 162° C.; and (b) 30% by weight of a polyvinyl alcohol with a hydrolysis degree of 88 mole %. The film was stretched at 130° C. longitudinally by a factor of 2.5 and at 120° C. transversely by a factor of 7.5.

The resulting clear, biaxially-oriented film had a thickness of 45 microns, a barrier layer of 1.6 micron, and an oxygen permeability of 15.9 $cm^3/m^2 \cdot d \cdot bar$ at 93% r.F.

EXAMPLE 7

Onto the film described in Example 6, 4.3 $g/cm^2$ of a heat sealing lacquer comprised of an ethylene-vinyl acetate copolymer was applied by means of gravure-printing.

Following the sealing of a sample in a sealing apparatus (Sentinel type) at a pressure of 0.5 $N/cm^2$ and a heating time of 0.5 seconds, the following sealed joint strengths were obtained:

| Sealing Temperature | Layer against Layer | Layer against Side A of film |
|---|---|---|
| 60° C. | 3.3 N/15 mm | 2.2 N/15 mm |
| 80° C. | 3.3 N/15 mm | 2.3 N/15 mm |
| 100° C. | 4.5 N/15 mm | 2.2 N/15 mm |

EXAMPLE 8

The film described in Example 6 was corona treated, then coated with (i) 0.5 $g/cm^2$ of an adhesion promoter based on polyurethane and, following the evaporation of the solvent with (ii) 2 $g/cm^2$ (solids) of a cold-sealing dispersion having a viscosity of 12 s (Ford-measuring cup 4 mm, 100 $cm^3$, at room temperature.

A sample of this film was sealed in an instrument (Brugger Co.) with a 5 cm long, 12 cm wide sealing jaw having 8 grooves, at 0.5 s and 0.5 M.Pa.

The sealed joint strength measured after sealing of the layers against each other was 1.5N/15 mm after 8 days and 1.9N/15 mm after storage for 6 weeks at room temperature. No string formation occurred upon the opening of the sealed joint.

What is claimed is:
1. A multilayer film which comprises:
   (a) an inner barrier layer D comprised of a saponified ethylene-vinyl alcohol copolymer which contains about 15 to about 60 mole % ethylene units and which is saponified to at least approximately 90%, said inner barrier layer presenting a first surface and a second surface;
   (b) on at least one of said first and second surfaces, an adhesion-promoting layer C comprised of a modified polyolefin; and
   (c) adjacent to said adhesion-promoting layer, a layer B comprised of at least one polymer selected from the group consisting of a polypropylene homopolymer, a propylene copolymer, and said modified polyolefin, wherein all of the layers of said multilayer film are coextruded to form a multilayer composite, which is then biaxially oriented under substantially the same stretching conditions to form said multilayer film.

2. A multilayer film as in claim 1, further comprising a sealable layer A adjacent to at said layer B.

3. A multilayer film as in claim 2, wherein said layer A and said layer B comprise a single layer comprised of a blend of the polymer components for said layers A and B.

4. A multilayer film as in claim 1, wherein said layer C and said layer B comprise a single layer comprised of a blend of the polymer components of said layers C and B.

5. A multilayer film as in claim 2, wherein said sealable layer A comprises at least one polymer selected from the group consisting of a homopolymer or a copolymer of an alpha-olefin; an ionomer; a mixture of different polyolefins; and an ethylene-propylene-$C_n$ terpolymer where $C_n$ denotes an alkylene monomer having n carbons, n being an integer ranging between 4 and 10.

6. A multilayer film as in claim 5, wherein said sealable layer A comprises an ethylene copolymer or an ethylene-propylene-butylene terpolymer wherein the ethylene content is within the range of about 0.1% and about 15% by weight and the butylene content is within the range of about 1% to about 20% by weight.

7. A multilayer film as in claim 1, wherein each of said first surface and said second surface of inner barrier layer D is provided with an adhesion-promoting layer C adjacent thereto and a layer B adjacent to each layer C, respectively.

8. A multilayer film as in claim 7, further comprising a sealable layer A adjacent to each layer B, respectively.

9. A multilayer film as in claim 1, further comprising a sealable outer layer facing at least one of said first surface and said second surface of said inner barrier layer D.

10. A multilayer film as in claim 9, wherein said sealable outer layer is adjacent to an adhesion-promoting layer C.

11. A multilayer film as in claim 9, wherein said sealable outer layer comprises at least one polymer selected from the group consisting of an ethylene-vinyl acetate copolymer, an acrylate, and an ionomer.

12. A multilayer film as in claim 10, wherein said layers C and A comprise a single layer, comprised of a blend of the polymer components of said layers C and A.

13. A multilayer film as in claim 8, wherein said layers C, B, and A provided on said first surface comprise a single layer and said layers C, B, and A provided on said second surface comprise a single layer.

14. A multilayer film as in claim 1, wherein said inner barrier layer D comprises a mixture of an ethylene-vinyl alcohol copolymer with about 0.5 to about 50% by weight of a carbonyl-containing polymer.

15. A multilayer film as in claim 14, wherein said carbonyl-containing polymer is selected from the group consisting of a polyamide and a copolyamide.

16. A multilayer film as in claim 15, wherein said carbonyl-containing polymer comprises a copolyamide having a melting point of less than 210° C.

17. A multilayer film as in claim 1, wherein said inner barrier layer D includes a hydroxyl group-containing oligomer or polymer.

18. A multilayer film as in claim 17, wherein said inner barrier layer D includes at least one member selected from the group consisting of trimethylolpropylene, neopentyl glycol, and polyethylene glycol.

19. A multilayer film as in claim 1, wherein the modified polyolefin of said adhesion-promoting layer C comprises a graft polymer.

20. A multilayer film as in claim 1, wherein said layer B further comprises at least one low-molecular, miscible resin.

21. A multilayer film as in claim 1, wherein said layer B further comprises finely distributed, solid pigment particles in an amount ranging between about 1% and about 25% by weight, the size of said particles ranging between about 0.1 and 20 microns.

22. A multilayer film as in claim 2, wherein said sealable layer A comprises at least one additive selected from an antistatic agent, a slip agent, a lubricant, and an antiblocking agent.

23. A multilayer film as in claim 1, further comprising a low-temperature sealable layer applied to at least a portion of one outer surface of said film, said low-temperature sealable layer having a sealing-onset temperature lower than the sealing-onset temperature of said sealable layer A.

24. A multilayer film as in claim 23, wherein said low-temperature sealable layer comprises an ethylene-vinyl acetate copolymer as its principal component.

25. A multilayer film as in claim 23, wherein said low-temperature sealable outer layer is pressure-sealable.

26. A multilayer film as in claim 24, wherein said low-temperature sealable layer comprises a natural rubber latex.

27. A multilayer film as in claim 1, wherein said inner barrier layer D comprises at least two individual layers.

28. A multilayer film as in claim 27, wherein said individual layers are separated by an adhesion-promoting layer therebetween.

29. A packaged article, comprising the article to be packaged surrounded by a package comprised of the multilayer film as defined by claim 1.

30. A multilayer film as in claim 1, wherein said layers are coextruded at a die temperaure of about 230° C.

* * * * *

UNITED STATES PATENT AND TRADEMARK OFFICE
CERTIFICATE OF CORRECTION

PATENT NO. : 4,572,854

DATED : Feb. 25, 1986

INVENTOR(S) : Hermann Dallmann & Hans J. Palmen

It is certified that error appears in the above-identified patent and that said Letters Patent is hereby corrected as shown below:

Title page:

[75] Inventors: Hermann Dallmann, Wiesbaden; Hans J. Palmen, Walluf, both of Fed. Rep. of Germany

[22] Filed: Feb. 22, 1984

Signed and Sealed this

Twentieth Day of May 1986

[SEAL]

Attest:

DONALD J. QUIGG

Attesting Officer

Commissioner of Patents and Trademarks